March 11, 1958     J. G. HAWLEY     2,826,277
COMPOUND PRESSURE CYLINDER FOR BRAKES
Filed Feb. 13, 1956     2 Sheets-Sheet 1

INVENTOR.
JESSE G. HAWLEY
BY
ATTORNEY

March 11, 1958   J. G. HAWLEY   2,826,277
COMPOUND PRESSURE CYLINDER FOR BRAKES
Filed Feb. 13, 1956   2 Sheets-Sheet 2

INVENTOR.
JESSE G. HAWLEY
BY
ATTORNEY

United States Patent Office 2,826,277
Patented Mar. 11, 1958

2,826,277

COMPOUND PRESSURE CYLINDER FOR BRAKES

Jesse G. Hawley, Penn Yan, N. Y., assignor to The Goodyear Tire & Rubber Company, Akron, Ohio, a corporation of Ohio Application February 13, 1956, Serial No. 565,121

5 Claims. (Cl. 188—152)

This invention relates to a compound pressure cylinder for operating brakes and is especially useful in the manufacture of disc brakes.

Heretofore, it has been proposed to provide a rotative wheel with a brake disc carried thereby to mount stationary cylinders adjacent the brake disc and to employ pistons in those cylinders for applying stationary brake shoes to the disc. However, while such brakes have been very satisfactory, some difficulty has been experienced in that dust from the brakes found its way into the brake cylinders and caused wear and fouling of the cylinders and pistons.

Another difficulty has been the side loading of the cylinders under torque of the brakes which caused excessive wear of the pistons and cylinders.

Still another difficulty was that, as wear increased the brake clearance, it became necessary to use more and more fluid to operate the brakes.

It is an important object of the present invention to provide a pressure cylinder of compound construction in which fluid pressure is first applied to a cylinder of small diameter to take up the clearance of the brake with relatively small displacement of pressure fluid and fluid pressure is thereafter applied to a cylinder of larger diameter to set the brake while the take up adjustment is locked against movement.

Another object of the invention is to provide a pressure cylinder in which the brake operating piston is adequately adapted to sustain side load under torque developed by brake application.

Another object is to provide such a structure in which the fluid seals are well protected from the entrance of brake duct.

Other objects are to provide improved braking action, to provide automatic clearance control, and to provide facility of repair.

These and other objects will appear from the following description and the accompanying drawings.

Figure 1:
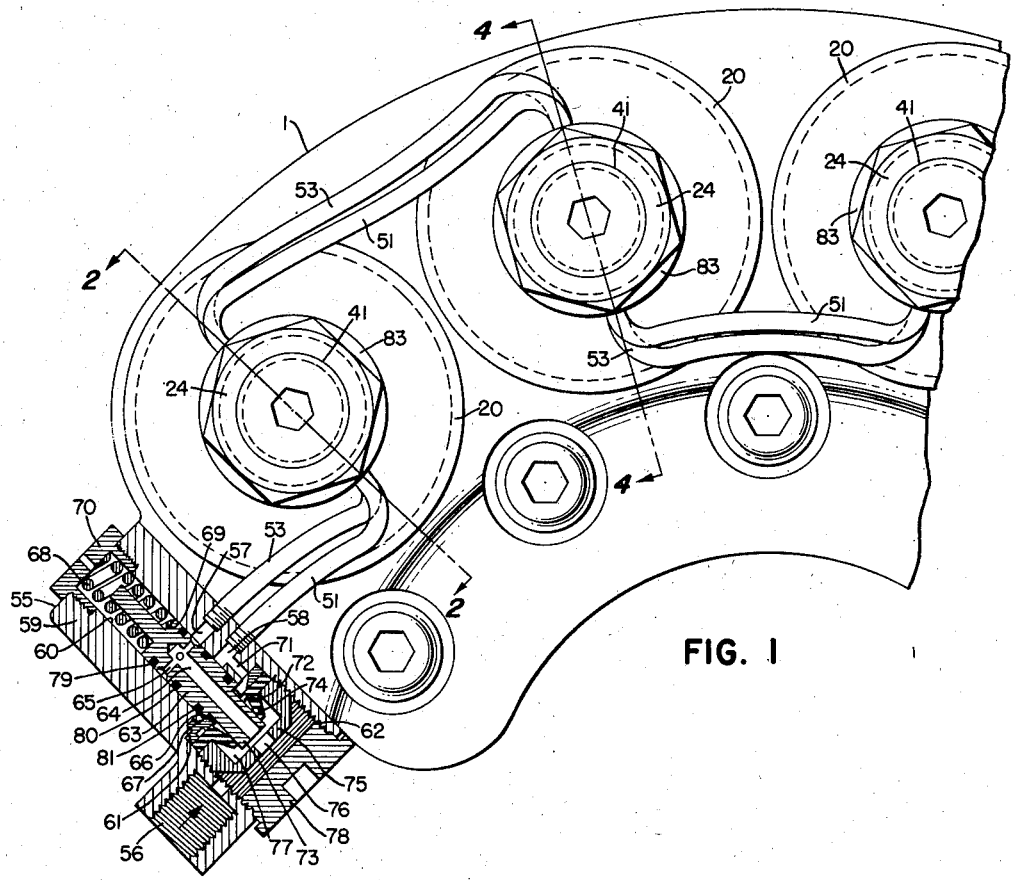
Fig. 1 is a side elevation of a non-rotatable brake support member.
Figure 4:
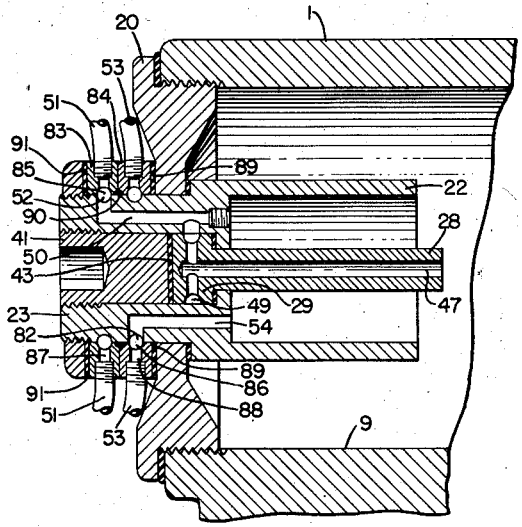
Fig. 4 is an enlarged sectional view of the outer and inner cylinders and their pressure connections taken on line 4—4 of Fig. 1.

Referring to the drawings, the numeral 1 designates a non-rotatable brake support mounted adjacent a rotatable wheel 2. The wheel supports one or more brake discs 3, 4 suspended therefrom and having notches 5 thereacross for engaging keys 6 of the wheel whereby the discs rotate only with the wheel but may float axially thereof.

The brake support 1 includes a removable bracket 7 having a radially outwardly directed flange 8 in spaced apart relation to support 1 and defining a channel therebetween through which the discs 3 and 4 rotate. Support 1 is formed with a number of axially disposed cylinders such as 9. A brake shoe 10 is mounted on a piston support 11 movable axially of the cylinder and opposed to one side of the disc 3. A second shoe 12 is mounted opposite thereto on bracket 8. A brake shoe carrier 13 is mounted for floating movement axially of the brake upon guide rod 14 spanning a trough 15 of the bracket 7. A pair of brake shoes 16, 17 are mounted on opposite faces of the carrier 13 facing the discs 3 and 4 respectively. The arrangement is such that when brake shoe 10 is moved to the right in Fig. 2, disc 3 is engaged by shoes 10 and 16 and disc 4 is engaged by shoes 17 and 12 under axial pressure due to the floating suspension of discs 3 and 4 and of carrier 13.

The piston support 11 is cup-shaped and has a head portion 18 of reduced diameter slidably fitted in an aperture 19 of reduced bore of the cylinder 9 whereas its skirt is slidably fitted in the larger bore of the cylinder 9. For convenience of repair and replacement, the head 20 of the cylinder is removably threaded into the end of the cylinder, as at 21. A tubular guide sleeve cylinder 22 has a mounting portion 23 of reduced diameter mounted through a central aperture of head 20 and is clamped thereto by a nut 24 engaging external threads of the reduced portion. A tandem piston 25 has a large head 26 slidably engaging the interior of the skirt of piston support 11 and a reduced portion slidably fitting within the guide cylinder 22.

The piston 25 has an axial bore 27 and a guide pin 28 slidably extending therethrough. It has a head 29 seated in a countersink 30 of guide sleeve cylinder 22. A threaded plug 41 engages a threaded bore of reduced mounting portion 23 of guide sleeve cylinder 22 and is sealed in place by gaskets 42 and 43. A gasket or O-ring 44 seals the bore 27 of piston 25 to guide pin 28. A second O-ring 45 seals the large end 26 of piston 25 to the skirt of piston 11. A groove 46 about the aperture 19 houses an annular dust seal for the piston support 11.

The guide pin 28 has an axial bore 47 open to the space between pistons 25 and 11 and connecting with cross openings 48 of the pin which by way of an annular groove 49 connects with drilled openings 50 through the wall of the reduced mounting portion of sleeve cylinder 22 to the outboard end of the mounting portion and an encompassing groove 52 thereabout, and thence to a pressure line 51 in a manner hereinafter described.

It will be apparent that fluid pressure applied through line 51 will enter the space between pistons 11 and 25 to clamp the brake shoes against the discs 3 and 4.

A second pressure line 53 connects in a manner hereinafter described by drilled openings 54 to the space between the left end of the guide sleeve cylinder 22 and the piston 25 to supply fluid under pressure to preliminarily adjust the brake shoe position and thereafter to assist in applying the brake.

Figure 2:
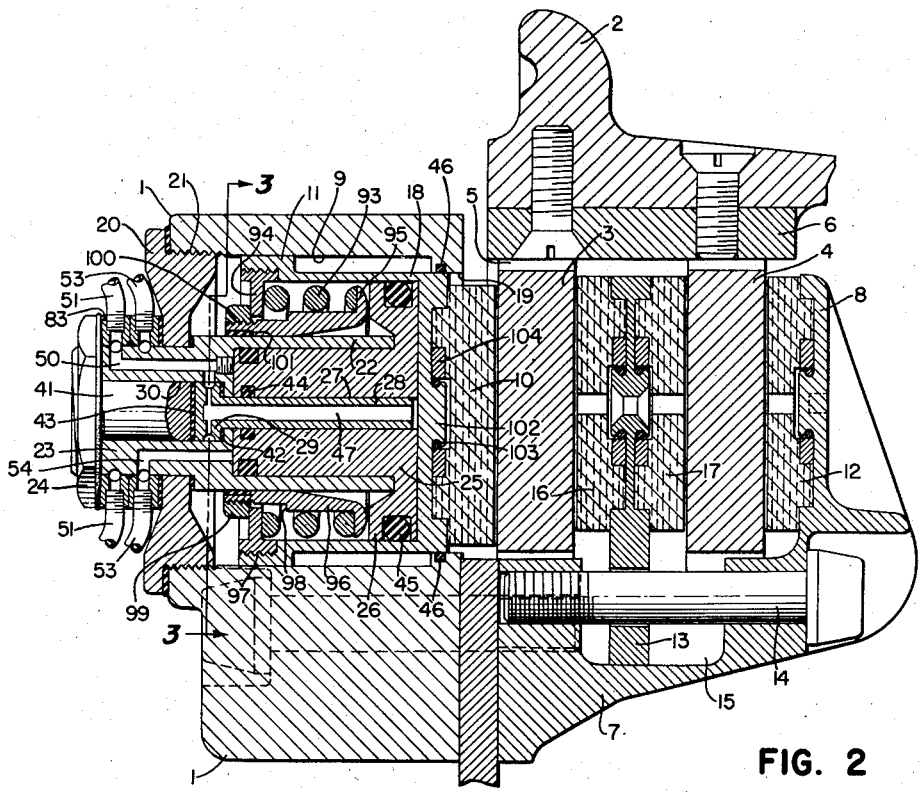
Fig. 2 is a sectional view of a brake operating cylinder, its piston, brake shoes and a portion of the wheel with a brake disc thereon taken on line 2—2 of Fig. 1.
Figure 3:
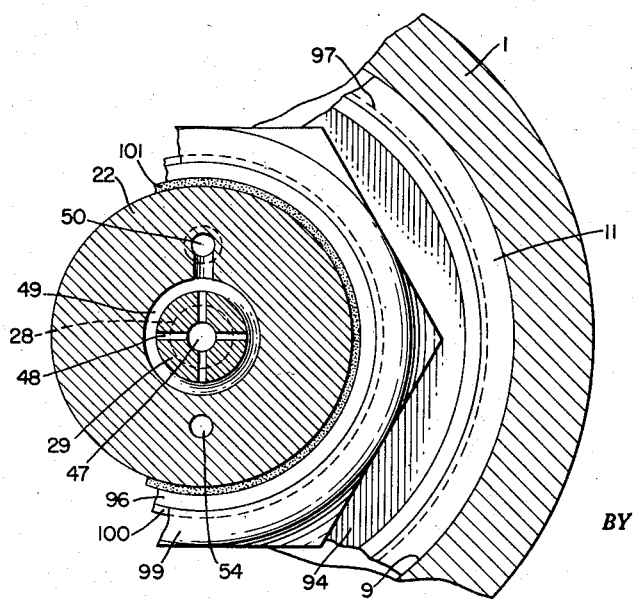
Fig. 3 is a cross sectional detail view of the guide sleeve 22 taken on line 3—3 of Fig. 2 at an enlarged scale.

In a brake of this type, it is desirable to keep brake shoe movement as low as possible and it is important therefor to provide for preliminary adjustment of the brake shoe to a position of minimum clearance with use of a minimum amount of brake fluid and thereby to provide deflection compensation with reduced fluid displacement. To this end, the piston 25 is of relatively small diameter as compared to the diameter of piston 11 and may be displaced a greater distance with an equal quantity of fluid. Means are provided so that when fluid pressure is applied to operate the brake, the fluid will first enter the space between guide sleeve cylinder 22 and piston 25 whereby piston 25 will be adjusted to the right as seen in Fig. 2 with small fluid displacement and when adjustment has been accomplished, fluid pressure will be supplied to piston 11 over a greater area to provide increased brake pressure. For this purpose, a distributing valve 55 is provided. It has a fluid pressure inlet 56 and two fluid pressure outlets 57 and 58 formed in a body 59. Body 59 has an axial cylinder bore 60 extending from one end thereof, to a shoulder 61 of a counterbore 62. The cylinder bore 60 connects with outlets 57 and 58. A valve spindle 63 is slidably mounted in bore 60 and has an annular groove thereabout normally in alignment with outlet 57 and at all times communicating with inlet 56 by way of an axial bore 64 of the spindle extending to one end thereof and cross opening 65 intersecting the bore 64 at the groove. A shoulder 66 of the spindle normally abuts a shoulder 67 of the valve body and is held thereagainst by a tension coil spring 68, one end of which abuts against a shoulder 69 of the spindle, and the other end of which rests on an apertured threaded plug 70 inserted in the bore 60.

The outlet 58 is normally closed by the spindle but is connected by a bypass 71 with an annular space 72 between a reduced stem 73 of the spindle 63 and an annular self-sealing lip gasket 74 thereabout. The lip gasket 74 is held against the shoulder 61 by a threaded ferrule 75 having a port 76 communicating between inlet 56 and a space 77 about the end of the spindle. A threaded plug 78 engages and closes the counterbored end of the valve body. The arrangement is such that when fluid under pressure is applied to inlet 56, it flows freely by way of port 76, bore 64 of the spindle and cross openings 65 to line 53 and thence to opening 54 in a manner hereinafter described to advance piston 25 until brake engagement occurs. At this point, as the piston 25 cannot advance further, the line pressure builds up at port 76 and acting against spindle 63 forces it axially of the valve body compressing spring 68. Under this superior pressure, the spindle moves to a new position where it closes outlet 57 and its reduced stem 73 passes beyond the lip gasket 74 opening the space 72 to port 76 so that fluid under pressure can pass through bypass 71 and outlet 58 to line 51 and passages 50, 49, 48, 47 to the space between pistons 25 and 11 applying pressure to piston 11 over a greater area. At the same time, the pressure fluid entrapped between piston 25 and sleeve cylinder 22 is retained by the closing of outlet 57. For sealing the joint between valve spindle 63 and the valve body, a plurality of annular grooves are formed in spindle 63 and O-rings 79, 80, 81 are provided in the grooves.

To provide for connecting pressure lines 51 and 53 to a number of similar brake operating cylinders and also to permit repairs and replacement, the reduced portion 23 of each sleeve cylinder 22 is formed with an encompassing groove 52 as herein described and is also formed with an encompassing groove 82 spaced axially from groove 52. A pair of similar rings 83, 84 are adapted to slide over the reduced end 23 of sleeve 22 and have inwardly open grooves 85, 86 respectively to align with drilled passages 50 and 54 respectively. The rings 83, 84 have radial ports 87, 88 respectively which are secured to lines 51 and 53. Ring 84 is separated from cylinder head 20 by a ring gasket 89 and is sealed to ring 83 and mounting portion 23 by a ring gasket 90. A gasket 91 is provided at the opposite face of ring 83 and jamb nut 24 holds rings 83 and 84 clamped against their gaskets. Drilled passage 50 extends axially of portion 23 with inwardly and outwardly directed ports to connect groove 85 to groove 49. Passage 54 extends axially of portion 23 but has an outwardly directed port to connect to groove 82.

It is provided that the brake shoes be released upon release of fluid pressure thereto by spring pressure, and for this purpose, a compression coil spring 93 is positioned within the skirt of piston 11 with one end abutting a flange 94 extending inwardly of the skirt of the piston, and the other end abutting an outwardly directed flange 95 of a sleeve 96 carried by the guide sleeve cylinder 22. The flange 94 is secured to the piston support 11 by cooperating screw threads 97. To provide a limit to movement of piston support 11 relative to the sleeve 96, the sleeve is formed with a shoulder 98 extending radially beyond flange 94 and a threaded stop ring 99 is secured to threads 100 or sleeve 96 so as to stand facing flange 94. The arrangement is such that flange 94 is between two stop shoulders of sleeve 96 between which it is free to move.

Automatic adjustment of the brake clearance is provided for by securing sleeve 96 frictionally to sleeve cylinder 22 and for this purpose, a band 101 of friction material is clamped between the sleeves as by providing the sleeve 96 with a split and tapered threaded portion 100 and forcing the threaded flange 99 thereover. The arrangement is such that in the fully retracted position of the brake shoe, the flange 94 contacts stop flange 99 and the shoe may be moved into braking engagement without travelling far enough to contact flange 94 with shoulder 98. However, should the brake shoe so wear as to require applying movement greater than normal, flange 94 would engage shoulder 98 and would move sleeve 96 to a new position of adjustment.

The brake shoe 10 is removably secured to piston support 11 by any convenient means, as for example by a button 102 of dovetailed cross section on the piston support 11 adapted to be engaged by a split spring ring 103 confined in an aperture of a metal washer 104 molded into and adhered to the brake shoe 10. The aperture in the washer 104 is greater in diameter than the button 102 but less than the added thickness of the spring ring 103 so that the shoe is retained by the spring ring.

Where a multiplicity of brake cylinders are to be operated in unison, the pressure lines 51 and 53 are made in sections to extend from one cylinder to the next, as shown in Fig. 1, the cylinders being connected in parallel.

While certain representative embodiments and details have been shown for the purpose of illustrating the invention, it will be apparent to those skilled in this art that various changes and modifications may be made therein without departing from the spirit or scope of the invention.

I claim:

1. Apparatus for manipulating a brake shoe relative to another brake member, said apparatus comprising a first fluid pressure operated means for adjusting said brake shoe to take up the clearance relative to the other brake member, a second fluid pressure operated means for applying pressure to said brake shoe at the adjusted position, a fluid pressure source, a single valve means for controlling fluid pressure supply to said pressure operated means, said valve means comprising a spring biased plunger having a normally open passage connecting the fluid pressure source to said first fluid pressure operated means, said plunger being exposed to fluid pressure from said source opposed to the biasing spring of said plunger and normally closing a second passage between said source and the second said fluid pressure operated means, and the normally open passage being closed and said second passage being opened by movement of said plunger when fluid pressure on said plunger is increased by termination of clearance adjustment.

2. Apparatus for manipulating a brake shoe relative to another brake member, said apparatus comprising a cylinder having an open end and a closed end, a smaller cylinder secured to said closed end and extending toward said open end concentrically of the first said cylinder, a brake shoe carrier slidably mounted in the first said cylinder and having a cylindrically bored skirt, a tandem piston having a large end slidably fitting said skirt and a small end slidably fitting in said smaller cylinder, a source of fluid pressure means to supply fluid pressure from said source between said smaller cylinder and said tandem piston to adjust clearance of the brake, and means to supply fluid pressure from said source between said tandem piston and said brake shoe carrier to set the brake.

3. Apparatus for manipulating a brake shoe as defined by claim 9 in which the means for supplying fluid pressure comprises a source of fluid pressure and a single spring biased plunger valve adapted to be moved axially by fluid pressure supplied to the valve from said source to which an end of the plunger is exposed, said valve plunger controlling a normally open passage to said smaller cylinder adapted to be closed by movement of said plunger against its spring bias and a normally closed passage to the larger end of said tandem piston adapted to be opened by said plunger movement against its spring bias, and said plunger being adapted to be moved against its biasing spring under increase of fluid pressure due to termination of clearance adjustment of said brake shoe.

4. A compound pressure cylinder for operating a brake, said cylinder comprising a cylindrical chamber open at one end and closed by a removable head at the opposite end, a first piston fitted in said chamber for axial movement relative thereto said first piston having a head supporting a brake shoe and a skirt defining a cylindrical bore therewithin, a cylinder sleeve secured to the head of said chamber and having a cylindrical bore extending away from said head toward the open end of said chamber, a second piston of tandem construction having a large diameter head slidably fitting the bore of the first piston and a small diameter head for slidably fitting the bore of said sleeve, a fluid pressure supply, valve means for supplying fluid under pressure from said supply to the bore of said sleeve to adjust the clearance between the brake shoe and a cooperating brake member, and means for applying fluid pressure from the same supply between said first piston and the large diameter head of said second piston to apply pressure to said brake shoe at the adjusted position.

5. Apparatus for manipulating a brake shoe relative to another brake member, said apparatus comprising a fluid pressure supply, a plurality of cylinder and piston mechanisms mounted for series operation and each operated by liquid pressure from said supply, the first of said mechanisms having a cylinder of relatively small cross section and displacement and being normally open to said fluid pressure supply for advancing a brake shoe to initial engaging position, the second of said mechanisms having a cylinder of relatively large cross section and being normally closed to said fluid pressure supply, said second mechanism cylinder having said brake shoe secured thereto, a tandem piston having heads fitting in said first and second cylinders, and a fluid pressure control valve normally connecting said first cylinder to said supply and positively closing supply to said second cylinder, said valve being operable under high supply pressure to close off supply to said first cylinder and open supply to said second cylinder, said pressure control valve comprising a cylindrical valve chamber, a piston type valve member slidably mounted in said cylinder and held in one position by a spring, and one end of said valve member being exposed to pressure of the fluid supply whereby the piston may be moved to a second position under increased pressure of said supply.

References Cited in the file of this patent

UNITED STATES PATENTS

| | | |
|---|---|---|
| 2,170,851 | Carroll | Aug. 29, 1939 |
| 2,201,571 | Aikman | May 21, 1940 |
| 2,746,254 | Lucien | May 22, 1956 |